United States Patent [19]

Jones

[11] 3,890,365

[45] June 17, 1975

[54] ORGANIC REDUCTION PROCESS

[75] Inventor: David Colin Jones, Runcorn, England

[73] Assignee: Imperial Chemical Industries Limited, London, England

[22] Filed: Oct. 24, 1972

[21] Appl. No.: 299,806

Related U.S. Application Data

[63] Continuation of Ser. No. 558,250, June 17, 1966, abandoned.

[30]     Foreign Application Priority Data

June 30, 1965 United Kingdom............... 22726/65
Aug. 26, 1965 United Kingdom............... 36683/65
Oct. 17, 1965 United Kingdom............... 42640/65

[52] U.S. Cl..... 260/465.8 A; 260/465.1; 260/465.6; 260/485 R

[51] Int. Cl. C07c 121/02; C07c 121/26; C07c 121/28

[58] Field of Search.................. 260/465.8 A, 485 R

[56]         References Cited
         UNITED STATES PATENTS 3,489,789   1/1970   Dewar et al. ................. 260/465.8 A
3,732,276   5/1973   Van Eygen et al. .......... 260/465.8 A

*Primary Examiner*—Joseph P. Brust
*Attorney, Agent, or Firm*—Cushman, Darby & Cushman

[57]         ABSTRACT $\alpha\beta$-olefinically unsaturated nitriles or esters are reductively dimerised by means of an alkali metal amalgam in a homogenous organic reaction phase composed of the nitrile or ester, an agent (especially water) cooperating with the amalgam to provide a reduction system, a non-dimerisable unreactive polar organic amide and optionally an inert polar organic solvent.

10 Claims, No Drawings

ORGANIC REDUCTION PROCESS

This is a continuation of application Ser. No. 558,250, filed June 17, 1966, now abandoned.

This invention relates to reductive dimerisation ("hydrodimerisation") of $\alpha$-$\beta$ olefinically unsaturated organic compounds in alkali-metal amalgam reduction systems.

Of the many compounds that can be caused to undergo hydrodimerisation in alkali-metal amalgam reduction systems, derivatives of acrylic acid (the nitrile and esters with lower alkanols) assume greatest importance at this time. Over many years publications have appeared in which amalgam hydrodimerisation of olefinically unsaturated monomers has been described and discussed. Thus, the following works may be referred to: Harries and Eschenbach, Ber. 29 380 (1896); Harries and Hubner, Annalen 296, (1897); Harries et al, Ber. 31, 1806 (1898); Harries et al, Annalen 330, 235 (1904); Henle, Annalen 384, 16 (1906); Asahina and Shibata, J. Pharm. Soc. Japan 423, 391 (1917) (CA. 11, 2457); Vogel, J.C.S. (1927) 594 (at 597); Oomen and Vogel J.C.S. (1930) 2148 (at 2149); Bayer, Angew. Chem. 61, 229 (1949); Knunyants and Vyazankin, Invest. Akad. Nauk., S.S.S.R. Otdel Khim Nauk. (1957) 238 (English version is in Bull. Acad. Sci. U.S.S.R. Div. Chem. Sci. (1957), 243 ); Knunyants and Vyazankin, Doklady, Akad, Nauk. S.S.S.R. 113, 112 (1957); Knunyants and Vyazankin, Trudy Chetvertago Soveshchanya, po. Electrokhimii, Moscow (1956) 227; Knunyants and Gambaryan Uspekhi Khim. 23; 781, 1954, and British Patent Specification Nos. 923250, 1014428 and 1011552.

It will be evident from a consideration of the nature of the several monomers that have been caused to undergo hydrodimerisation by the aforementioned workers that activation of the olefinic bond of the monomer by an electron withdrawing substituent is an essential requirement for hydrodimerisation. Furthermore, the magnitude of the reduction potential that is developed in any given system by the alkali-metal must set a limit on feasibly reducible monomers. Where the reducibility of a given monomer is in doubt, a simple test can be performed.

An impediment to the development of processes for converting monomers, such as acrylonitrile, to difunctional dimers such as adiponitrile, has been the poor yields of dimer that have so far been realised both in terms of reacted monomers and, more important, reacted alkali-metal. The dimer is but one of a number of possible products and the efforts of investigators have been directed towards the discovery of conditions favouring dimerisation over full reduction or further polymerisation. The Applicants have discovered a process whereby certain olefinically unsaturated monomers may be converted into corresponding dimers in substantial yields both on reacted monomer and on reacted alkali-metal.

The present invention provides a process for reductively dimerising $\alpha$-$\beta$ olefinically unsaturated nitriles or esters (especially acrylonitrile, or the methyl or ethyl esters of acrylic acid) by means of an alkali-metal amalgam reduction system, which process is characterised in that the nitrile of ester is contained in an homogenous organic reaction phase composed of the nitrile of ester, an agent that co-operates with the alkali-metal of the amalgam to provide said amalgam reduction system, a non-dimerisable unreactive polar organic amide and, where said amide is not present as sole organic solvent, an inert polar organic solvent, and also in that the nitrile or ester accounts for from 2 to 40, preferably 2 to 25, mole % of said organic reaction phase, and said agent accounts for from 1 to 40 mole % (preferably from 2 to 30 mole %) of said organic phase, the polar organic amide and any inert polar solvent provide the remainder of said organic reaction phase and, when the organic amide is in admixture with an inert polar solvent, the organic amide provides more than 5, advantageously more than 10, preferably more than 20.

When the proportion of reactive monomer (e.g. acylonitrile) exceeds 25 mole %, the proportion of agent, e.g. water, is advantageously less than 25 mole % and when the proportions of agent, e.g. water, exceeds 25 mole % the proportion of reactive monomer is advantageously less than 25 mole %. Preferably the proportions of reactive monomer and agent are each less than 25 mole %.

For obvious commercial reasons the amalgam which would normally be employed in any practical exploitation of the process of the invention would be sodium (or, possibly, potassium) amalgam.

The apparent pH of the organic reaction phase should be controlled so as to avoid the development of unduly alkaline conditions. The preferred range of apparent pH is 7 to 11.5; at lower values formation of fully reduced monomers is more favoured and at higher values cyanoethylation or other further polymerisation reactions are appreciably encouraged.

Reference is made to the apparent pH of the reaction medium because it cannot be presumed that in predominantly organic solvent systems a given reading on conventional pH recording equipment or a particular colour change in the case of a chemical indicator will have precisely the same significance in terms of hydrogen ion concentrations as it would have in wholly aqueous systems. Nevertheless, it is convenient and helpful to regard an effective pH of less than 7 as indicating acidic conditions and an effective pH of greater than 11.5 as indicating strongly alkaline conditions.

The most suitable agent for co-operating with the alkali-metal to form the reduction system is water but good results are obtainable with methanol or ethanol as replacements for water if for any reason it is desired not to use water.

The polar organic amide is advantageously one of the class having the general formula $R_1 R_2 N CO R_3$ in which $R_1$, $R_2$ and $R_3$ each represent H or lower (say up to $C_4$) alkyl groups and $R_1$ and $R_2$ are optionally joined together to form, with the N atom, a cyclic amide. Preferably $R_1$ $R_2$ and $R_3$ each contain not more than 2 carbon atoms as exemplified by formamide, dimethyl formamide, N,N-dimethyl acetamide and N-methyl 2-pyrrolidone.

Where the physical properties of the amide prevent it from forming a homogeneous phase with the monomer and water (say) as said agent, an inert polar organic solvent will be necessary. The choice of a suitable polar oroganic solvent need occasion no difficulty and the process does not appear to be greatly sensitive to changes in the nature of the polar organic solvent although optimum conditions may be found to vary somewhat for different solvents. Applicants have confirmed the suitability of acetonitrile, adiponitrile, dioxan, dimethyl sulphoxide and tetrahydrofuran. The use of adiponitrile is a special case when acrylonitrile is being hydrodimerised in that it is also the product. However, in a continuous reaction system involving hydrodimerisation of acrylonitrile and recirculation of organic reaction liquors an appreciable quantity of product adiponitrile may be present in the recycled liquors irrespective of whether or not the solvent initially employed comprised adiponitrile, and such adiponitrile is, of course, to be considered as solvent. Examples of amides requiring the use of auxiliary solvents are propionamide formanilide, and ethyl carbamate which are solids at ordinary temperatures.

In addition to having a proportion of dimer in admixture with the components jointly constituting said organic phase as the reaction proceeds, other purposeful additives may usefully be present. Thus, a polymerisation inhibitor such as N,N-dimethyl p-nitrose aniline is advantageously employed and some degree of yield-enhancement is achievable by addition of quaternary ammonium salts. General classes of suitable quaternary ammonium salts are to be found described in Dutch Pat. Specification No. 6504863 (which is equilvalent to Belgian Pat Specification No. 662661 and stems from Australian Pat. Application No. 48630/64, filed August 27th 1964, by Imperial Chemical Industries of Australia and New Zealand Ltd.)

A function of the quaternary ammonium salt is the suppression of the undesired full reduction of the monomer (giving propionitrile in the case of acrylonitrile) and it is believed that this is achieved by reason of preferential adsorption on the amalgam surface. The differing effects of different quaternary salts can be accounted for on this basis. The activity of the polar amide necessarily employed in the process of the present invention is believed to be analogous to that of quaternary ammonium salts. Such belief is consistent with the observation that amides containing no bulky alkyl substituents are the most effective amides.

No monopoly is sought hereby for any process in accordance with the invention that involves, in addition to the use of a polar organic amide, the use of a quaternary ammonium salt. Processes involving quaternary salts are the subject of other applications for patent protection by the Applicants or their Associates. Examples involving quaternary salts are given herein for comparison purposes and because best yields have in fact been obtained when quaternary ammonium salts have been used in the process of the present invention.

The hydrodimerisation reaction may be conducted at any convenient temperature. The range of from 10° to 55°C probably embraces all practically feasible temperatures for large scale operations and normally the reaction will be conducted at a temperature of from 30° to 40° or possibly 45°C. since (a) the reaction is exothermic and in the absence of inconvenient refrigeration techniques the temperature of the reaction medium will tend to rise well above ambient temperature and (b) at temperatures above about 45°C., especially above 55°C., polymerisation reactions beyond the dimer stage tend to be markedly favoured. In the laboratory, studies may conveniently be made at a temperature of 0°C if desired.

The heterogenous nature of the overall reaction system is responsible for the pronounced tendency that exists for local extremes of alkalinity to occur in the region of amalgam surfaces in which regions the formation of reaction products takes place. It is, therefore, very important that adequate measures be adopted for ensuring proper "pH" control in the system. Intense agitation and mixing of the amalgam and organic phases is very desirable and the use of a buffer system for pH control as well as moderate rates of supply of amalgam are very desirable. In any large scale operation the use of a buffer system will probably be a practical necessity. A phosphate buffer system is a possibility but by far the most preferred buffering agent is carbon dioxide which is markedly more soluble in, say, acetonitrile, dimethylformamide, dimethyl sulphoxide, dioxan and tetrahydrofuran as polar organic solvents than in water itself. Carbon-dioxide can, therefore, provide a reserve of acidic neutralising agent for the alkali metal at all points in the organic reaction medium. The sodium bicarbonate which forms is poorly soluble in the organic reaction medium and forms a suspension conveniently lending itself to control of solids-content by cyclone-separation techniques. The apparent pH of a saturated solution of carbon dioxide in the reaction medium is stable at about 8.5 to 9.5, which is a very suitable range. For small scale work, concentrated hydrochloric acid can be used for pH control but in larger scale work control becomes difficult.

Where enhanced reaction rates and low mean amalgam retention times in the reaction zone are desired, measures may be adopted that result in an increase in the effective area of contact between the amalgam and the organic reaction phase per unit mass of amalgam. Preferred amongst possible chemical engineering techniques is a technique akin to fluidised bed procedure in which the amalgam is dispersed by causing the organic reaction medium to pass upwardly through a zone containing the amalgam, and into which fresh amalgam is continuously or intermittently being supplied. The rate and mode of supply of amalgam is so controlled that there is carryover of only essentially de-nuded amalgam to, say, a cyclone separator.

General process conditions and suitable equipment for performing small scale processes in accordance with the invention will now be described in detail.

A convenient reaction vessel is an elongated glass flask (say, of 700 mls. capacity) having a spring-clamped removable 5-necked cover and an outlet from its sump allowing controlled withdrawal of amalgam from the vessel interior. The vessel conveniently possesses a side branch towards its sump through which the sensor device of a pH recorder is inserted and has a suitable stirrer fitted in a control neck of the cover. Two other inlets in the cover permit supply of carbon dioxide or concentrated hydrochloric acid and amalgam to the vessel interior, a fourth inlet accommodates a thermometer and the fifth inlet is fitted with a condenser leading to a vapour trap for capturing vapours entrained in carbon dioxide leaving the condenser. A typical charge of ingredients would be 120g. of dimethylformamide, 15 g. of acrylonitrile, 5 g. of water, and optionally 10 g. of tetraethyl ammonium chloride.

Amalgam of, say, 0.3% sodium content is very suitable for use and its rate of supply is advantageously 0.8 mls./minute. At high rates of supply of amalgam the avoidance of local extremes of alkalinity and of temperature with attendant oliger formation is more difficult.

Analyses of fresh and spent amalgem is conveniently achieved by back-titration methods. Analyses of organic liquors for product adiponitrile and dicyanoethyl ether (say) on the one hand and residual monomer and propionitrile (say) on the other hand are best achieved before removal of bicarbonate or chloride neutralisation product from the organic liquor by gas/liquid chromatography employing, say, succinonitrile and butyronitrile respectively as internal standards. In laboratory scale work involving adiponitrile as solvent, carbon 14 tracer techniques are best employed.

EXAMPLES 1 to 7

The reactive monomer was acrylonitrile, the agent co-operating with the amalgam to provide the reduction system was water and the organic polar amide was variously formamide, dimethyl formamide, dimethyl acetamide, and N-methyl 2-pyrrolidone. Other experimental variables and yields are given in the following Table I on next page.

TABLE I

| Ex. No. | Additive | Wt. of Additive gm. | Wt. of Acrylo-nitrile gm. | Wt. of Water gm. | Wt. of Amalgam gm. | Wt. of Na in Amalgam gm. | Time Min. | Temp. °C | pH | % yield of Adipo-nitrile on Acrylo-nitrile | % yield of Adipo-nitrile on Na | % conversion of Acrylo-nitrile |
|---|---|---|---|---|---|---|---|---|---|---|---|---|
| 1 | Dimethyl Formamide | 100 | 20 | 5 | 2500 | 2.5 | 120 | 0 | 8–11 | 95.5 | 61 | 18 |
| 2 | Dimethyl Formamide | 100 | 10 | 5 | 2500 | 2.5 | 120 | 0 | 8–11 | 95 | 52.5 | 30.8 |
| 3 | Formamide | 200 | 10 | 5 | 2500 | 2.5 | 120 | 0 | 10–11 | 76 | 45 | 26 |
| 4 | N,N Dimethyl Acetamide | 220 | 40 | 5 | 2500 | 2.5 | 120 | 5 | 10–11 | 100 | 52 | 7.5 |
| 5 | N,N Dimethyl Acetamide | 220 | 20 | 5 | 1250 | 1.25 | 60 | 0 | 10–11 | 100 | 65 | 10 |
| 6 | N-methyl 2-pyrrolidone | 81 | 5 | 5 | 2500 | 2.5 | 120 | 5 | 10 | 89 | 60 | 70 |
| 7 | N-methyl 2-pyrrolidone | 50 | 5 | 5 | 1500 | 1.5 | 60 | 0 | 7–10 | 86 | 44 | 30 |

The temperature, may be maintained at or around 35°C by appropriate use of a hot air stream or an icebath.

A convenient reaction period for a batch process is 1 hour after which about one third of the available monomer should have reacted.

Vigorous stirring should be employed throughout but in such manner as to ensure that only amalgam is withdrawn from the sump. The withdrawn amalgam should be substantially exhausted of alkali metal. Fresh amalgam is best supplied to uppermost levels of the charge within the vessel.

It is a requirement of the process for the present invention that preparations of necessary ingredients should be within selected ranges, based on the total number of moles of the monomer, the additive amide and any auxiliary organic solvent, and the agent, such as water, that co-operate with the amalgam to provide the reduction system. The limits of these ranges have been based on the results of investigating the variations in yields obtained when differing polar proportions of the several ingredients are employed.

The following examples illustrate the invention. The apparatus used for carrying out the examples and the manner of its use were as described hereinbefore. The pH of the organic reaction media was maintained within the preferred range of from 8 to 11, except where otherwise stated, by controlled additions of hydrochloric acid and the rate of addition of sodium amalgam was 0.8 to 1.0 ml/min. Mole percentages of ingredients are given in Table IV after the examples. In all examples, at most only a trace of the fully reduced monomer was obtained in the products.

EXAMPLES 8 to 10

Acrylonitrile was reductively dimerised to adiponitrile using sodium/mercury amalgam in a reaction medium containing water, dimethyl formamide and varying amounts of acetonitrile. Temperature was maintained at 5°C and pH was kept between 7 and 11 by addition of 2N-hydrochloric acid. The amalgam contained 0.1 wt. % sodium and was added at 1.54 ml/min. until 2.5 g. sodium had been added.

Yield of adiponitrile was estimated by gas liquid chromatography.

Results are quoted in the accompanying Table II.

EXAMPLES 11 and 12

Examples 8 to 10 were repeated with the variations in reaction medium quoted in Table II except that 4.85 g. sodium was added as 0.3 wt. % Na/Hg amalgam at 1.0 ml/min.

EXAMPLES 13 to 23

Examples 11 and 12 were repeated with different additives in place of the dimethyl formamide and with the variations in reaction medium shown in Table II. Examples 13 to 15 were performed with dimethylacetamide, 16 to 18 with N-methyl-2-pyrrolidone and 19 to 23 with formamide. In runs 13 to 20 2.5 g. sodium was added as 0.3 wt. % Na/Hg amalgam at 1.54 ml/min. In runs 21 to 23 the corresponding figures are 4.85 g., 0.3 wt. % and 1.0 ml/min.

It will be seen that the presence of acetonitrile did not markedly affect yields of adiponitrile and that its presence in the reaction mixture could be tolerated thereby rendering its separation from acrylonitrile unnecessary if a mixture of the two substances is used as a starting material

TABLE II

| Ex. No. | Starting materials | | | | | Product | | Yield of ADN wt. % | |
|---|---|---|---|---|---|---|---|---|---|
| | ACN g. | H₂O g. | Additive g. | | MeCN g. | ADN g. | | on Na | ACN |
| 8 | 10 | 5 | 100 | DMF | 0 | 3.08 | | 52.5 | 95 |
| 9 | 10 | 5 | 100 | DMF | 5 | 2.76 | | 47.2 | 85.7 |
| 10 | 10 | 5 | 100 | DMF | 10 | 2.52 | | 43 | 82.2 |
| 11 | 20 | 5 | 205 | DMF | 0 | 6.9 | | 60.5 | 99 |
| 12 | 20 | 5 | 205 | DMF | 1 | 7.3 | | 64.5 | 99 |
| 13 | 20 | 5 | 220 | DMA | 0 | 3.43 | | 58 | 99 |
| 14 | 20 | 5 | 220 | DMA | 1 | 3.2 | | 55 | 99 |
| 15 | 20 | 5 | 220 | DMA | 5 | 2.9 | | 50 | 95 |
| 16 | .5 | .5 | 81 | N | 0 | 2.56 | | 43.6 | 89 |
| 17 | 5 | 5 | 81 | N | 1 | 2.49 | | 42.5 | 87 |
| 18 | 5 | 5 | 81 | N | 5 | 2.54 | | 43.0 | 82 |
| 19 | 10 | 5 | 200 | F | 0 | 2.6 | | 45 | 76 |
| 20 | 10 | 5 | 200 | F | 5 | 2.4 | | 41 | 75 |
| 21 | 20 | 5 | 205 | F | 0 | 6.0 | | 52 | 97 |
| 22 | 20 | 5 | 205 | F | 1 | 5.5 | | 49 | 98 |
| 23 | 20 | 5 | 205 | F | 10 | 5.75 | | 50 | 80 |

ACN = acrylonitrile
MeCN = acetonitrile
ADN = adiponitrile
DMF = dimethylformamide
DMA = dimethylacetamide
N = N-methyl-2-pyrrolidone
F = formamide

EXAMPLE 24

50 mls. of 0.2% sodium amalgam were run into a stirred solution of 40 g. of ethyl acrylate in 10 g. of water and 50 g. of dimethyl formamide over a period of 50 mins. The temperature of the solution was maintained below 10°C and the pH was controlled between 6 and 10 by the addition of dilute aqueous hydrochloric acid. The water, dimethyl formamide and unchanged ethyl acrylate was distilled off under reduced pressure and other added to the residue. The other solution was then filtered to remove the inorganic solids and the ether evaporated off to leave a pale yellowish liquid. This liquid was fractionated, yielding 2.5 g. of a fraction boiling at 248°–249°C. Infra-red analysis and G.L.C. analysis indicated that this fraction was diethyl adipate. The yield on Na was 60% and on acrylamide 58%.

Analysis Calcd. C=59.4%, H=8.9%, O=31.7%.
Found. C=59.4%, H=8.6%, O=31.3%.

EXAMPLE 25

50 mls. of 0.2% sodium amalgam were run into a solution of 20 g. of diethyl fumarate in 25 g. of dimethyl formamide and 5 mls. of water over a period of 10 mins. The temperature was kept below 10°C and the pH between 6 and 10 by the addition of aqueous hydrochloric acid. The water dimethyl formamide and unchanged diethyl fumarate were distilled off under reduced pressure. The residue was extracted with methylene chloride and the organic layer filtered off. The methylene chloride was distilled off leaving tetraethyl butane 1.2.3.4 tetracarboxylate, B.P. = 170°–174°C at 0.66 mm. Analysis for tetraethyl butane 1.2.3.4 tetracarboxylate.

Calcd. C=55.5%, H=7.57%, O=37.0%.
Found. C=55.7%, H=7.81%, O=36.3%

EXAMPLES 26 to 29

These examples illustrate the process of the invention applied to further ester and nitrile monomers.

In Examples 26, the monomer was methyl methacrylate (40 g.) and the amide was dimethyl formamide (300 g.). The remainder of the organic reaction phase was water (15 g.). Sodium amalgam containing 0.3% sodium was supplied over 60 minutes at a rate of 0.8 ml/min.

The reaction temperature was 5°C. The dimer was obtained in 82% yield based on acrylonitrile and at 77% efficiency based on reacted sodium.

In Example 27, α-methylene glutaronitrile (15 g.) was employed as monomer, the remainder of the organic phase being provided by water (15 g.) and dimethyl formamide (300 g.). Reaction conditions were otherwise as for Example 26. The corresponding dimer (4.05 g.) was obtained at an efficiency based on reacted sodium of 36%.

In Example 28, a mixture of methyl acrylate (15 g.) and acrylonitrile (5 g.) was used as monomer. The remainder of the organic reaction phase consisted of water (5 g.) and dimethyl formamide (100 g.). Other reaction conditions were as for Example 26. The product was a mixture of diester, dinitrile and ester nitrile (1.6g., 3.2 g., and 0.34 g., respectively) at an overall efficiency based on reacted sodium of 72%.

In Example 29, the ingredients of the organic reaction phase and reaction conditions were as for Example 26 except that instead of methyl methacrylate methyl acrylate (45 g.) was employed as monomer. The corresponding dimer was formed at an efficiency based on reacted sodium of 60%.

EXAMPLES 30 and 31

These examples differed from the foregoing examples in that the amide solvent was replaced by a solution of a solid amide in an inert polar solvent. In both cases the monomer was acrylonitrile (30 g. and 60 g. respectively), the agent was water (10 g. and 50 g. respectively) and the inert polar solvent was acetonitrile (78 g. and 100 g. respectively). In Example 30 the amide was ethyl carbamate (150 g.) and in Example 31 the amide was propionamide (100 g.) The yields of corresponding dimer were 54% and 47% respectively based on reacted sodium.

EXAMPLES 32 to 36

These examples all employ a quantity of quaternary ammonium salt. No monopoly is, therefore, being sought for them hereby. In all the examples, the monomer was acrylonitrile and the agent was water. The quaternary ammonium salt was tetraethyl ammonium chloride and the pH was maintained substantially stable within the range of from 8 to 9.5 by continuously passing carbon dioxide gas through the reaction medium so as to maintain a saturated solution thereof. The reaction temperature was maintained within the range of from 30° to 40°C. Proportions of ingredients and yields of adiponitrile are given in the following Table III. Percentages by weight are based on the organic reaction phase plus quaternary ammonium salt.

TABLE III

| Ex. No. | Weight of AN | Nature and Weight of Solvent amide | % by Weight Water Content | % by Weight of Quat. Salt | Yield of ADN on Alkali Metal | % Yield on AN | % Recovery of reacted and unreacted AN |
|---|---|---|---|---|---|---|---|
| 32 | 15 g. | DMF 120 g. | 3 | 6 | 66.8 | 38.2 | 64 |
| 33 | 15 g. | DMF 120 g. | 10.5 | 4.48 | 95.8 | 103 | 103 |
| 34 | 15 g. | DMA 120 g. | 3.95 | 7 | 72.2 | 60.6 | 84.6 |
| 35 | 15 g. | DMA 120 g. | 3 | 6 | 69.7 | 50.6 | 80.2 |
| 36 | 15 g. | DMA 120 g. | 10.45 | 4.48 | 83.4 | 69.4 | 89.2 |

EXAMPLES 37 to 40

In these examples, the organic phase consisted of acrylonitrile (50 g. except for Example 40 where 10 g were used) dimethyl formamide (100 g.) and water (5 g.). In Examples 38 and 40 quaternary ammonium salt (tetraethyl ammonium paratoluene sulphonate — 5 g. and 20 g. respectively) was used. The amalgam was sodium amalgam (0.1% Na by weight) and 2.5 g. of sodium was supplied to the reaction vessel during the course of a reaction period of 120 minutes. The reaction temperature was 0° to 5°C. In all cases, the yield of adiponitrile on reacted acrylonitrile was above 95% and the yields on reacted sodium were variously 42.5, 53.5, 58.0, and 60.9%.

TABLE IV

| Ex. Nos. | Mole % Amide | Monomer | Water |
|---|---|---|---|
| 1 | 67.5 | 19 | 14 |
| 2 | 74 | 10 | 15 |
| 3 | 91 | 3 | 6 |
| 4 | 70 | 21 | 8 |
| 5 | 79 | 12 | 9 |
| 6 | 68 | 8 | 24 |
| 7 | 57 | 12 | 31 |
| 8–10 | 74 | 10 | 15 |
| 11, 12 | 80 | 11 | 9 |
| 13–15 | 79 | 12 | 9 |
| 16–18 | 68 | 8 | 24 |
| 19, 20 | 91 | 3 | 5 |
| 21, 22 | 87 | 7 | 5 |
| 23 | 84 | 7 | 5 |
| 24 | 42 | 24 | 34 |
| 25 | 46 | 16 | 38 |
| 26 | 77 | 7 | 16 |
| 27 | 80 | 3 | 17 |
| 28 | 72 | 13 | 15 |
| 29 | 76 | 8.5 | 15.5 |
| 30 | 35 | 13 | 12 |
| 31 | 18 | 14.5 | 36.5 |
| 32 | 76 | 13 | 11 |
| 33 | 62 | 10 | 28 |
| 34 | 72 | 14 | 14 |
| 35 | 72 | 15 | 13 |
| 36 | 57 | 12 | 31 |
| 37 | 51 | 37 | 10 |
| 38 | 51 | 38 | 10 |
| 39 | 51 | 38 | 10 |
| 40 | 72 | 11 | 15 |

I claim:

1. In a process for the reductive dimerization of an $\alpha,\beta$-olefinically unsaturated nitrile of ester starting material selected from the group consisting of acrylonitrile, lower alkyl acrylonitrile, lower alkyl acrylates and methylene glutaronitrile to obtain the correspsonding adiponitrile, lower alkyl-substituted adiponitrile, lower alkyl adipate and tetra-cyanooctane, respectively, therefrom by contacting an alkali metal amalgam at a measured pH of 7 to 11.5 and a temperature favoring dimerization with a liquid reductive dimerization medium containing said starting material and an agent operative with said amalgam to provide said reduction, said agent being selected from the group consisting of water and lower alkanols, the improvement wherein said dimerization medium is free from onium salts and initially consists essentially of a homogeneous solution of the starting material and agent in a liquid non-dimerizable unreactive organic polar amide of the formula $R_1R_2NCOR_3$ where $R_1$ and $R_3$ are hydrogen or lower alkyl or are alkyl of not more than 2 carbon atoms joined to form a cyclic amide and the N atom and $R_2$ is hydrogen or lower alkyl, or mixture of such amide and an inert non-amide polar organic solvent, the nitrile or ester starting material constituting 2 to 40 mole % of said medium, said agent constituting from 1 to 40 mole % of said medium and the balance of said medium consisting essentially of said amide of said mixtures thereof with inert polar organic solvent, with the amide constituting more than 5 mole % of said medium.

2. The process of claim 1 wherein said medium also includes an inert non-amide polar organic solvent, said nitrile or ester starting material and said agent constitute from 2 to 25 mole % and 2 to 30 mole %, respectively, of said medium and the polar organic solvent and the amide are the only other essential components of said reaction medium, the amide constituting more than 5 mole % of said reaction medium.

3. The process of claim 1 wherein said starting material is selected from the group consisting of acrylonitrile and the methyl and ethyl esters of acrylic acid; the agent is water and the amount of staring material and water in the reaction medium do not exceed 25 mole % and 30 mole %, respectively.

4. The process of claim 3 wherein the starting material is acrylonitrile.

5. The process of claim 1 wherein the amide is selected from formamide, dimethyl formamide, N,N-dimethyl acetamide and N-methyl 2-pyrrolidone.

6. The process of claim 1 wherein the dimerization is carried out at a temperature of 0° to 55°C.

7. The process of claim 1 wherein the balance of said medium consists essentially of said amide.

8. The process of claim 7 wherein the medium contains less than 25 mole % of starting material and les than 25 mole % of said agent.

9. In a process for the reductive dimerization of an $\alpha,\beta$-olefinically unsaturated nitrile or ester starting material selected from the group consisting of acrylonitrile, lower alkyl acrylonitrile, lower alkyl acrylates and methylene glutaronitrile to obtain the corresponding adiponitrile, lower alkyl-substituted adiponitrile, lower alkyl adipate or tetra-cyano-octane, respectively, therefrom by contacting an alkali metal amalgam at a measured pH of 7 to 11.5 and at a temperature of 0° to 55°C with a liquid reductive dimerization medium containing said starting material and an agent operative with said amalgam to provide said reduction, said agent being selected from the group consisting of water and lower alkanols, the improvement wherein said dimerization medium is free from onium saltls and initially consists essentially of a homogeneous solution of the starting material and agent in a liquid non-dimerizable unreactive organic polar amide selected from the group consisting of formanilide and ethyl carbamate admixed with inert non-amide polar organic solvent, the nitrile or ester starting material constituting 2 to 40 mole % of said medium, said agent constituting from 1 to 40 mole % of said medium, and the balance of said medium consisting essentially of said amide or said mixture thereof with inert polar organic solvent, with the amide constituting more than 5 mole % of said medium.

10. A process for the reductive dimerization of acrylonitrile to produce adiponitrile which comprises contacting said acrylonitrile with an alkali metal amalgam and an acid in a liquid dimerization medium which contains therein formamide.

* * * * *